(12) United States Patent
Byrd (10) Patent No.: US 6,874,970 B2
(45) Date of Patent: Apr. 5, 2005

(54) COUPLING ASSEMBLY HAVING A SPLIT-RING COLLAR LOCKING MECHANISM

(75) Inventor: Daniel V. Byrd, Ft. Payne, AL (US)

(73) Assignee: Playcore, Inc., Ft. Payne, AL (US)

( * ) Notice: Subject to any disclaimer, the term of this patent is extended or adjusted under 35 U.S.C. 154(b) by 0 days.

(21) Appl. No.: 10/268,305

(22) Filed: Oct. 10, 2002

(65) Prior Publication Data

US 2004/0071502 A1 Apr. 15, 2004

(51) Int. Cl.⁷ .............................................. F16L 41/00
(52) U.S. Cl. ........................ 403/192; 403/194; 403/249
(58) Field of Search .................... 403/187, 188, 403/192–195, 200, 204, 230, 231, 249, 251; 285/387, 388; 248/407–409, 411

(56) References Cited

U.S. PATENT DOCUMENTS

| | | | | |
|---|---|---|---|---|
| 459,910 A | * | 9/1891 | Hogan | 285/388 |
| 635,636 A | * | 10/1899 | Bailey | 285/40 |
| 2,047,714 A | * | 7/1936 | Smith, Sr. | 285/148.14 |
| 2,119,331 A | * | 5/1938 | Jensen | 285/387 |
| 2,194,973 A | * | 3/1940 | Durant | 285/388 |
| 2,463,407 A | * | 3/1949 | Melton | 285/149.1 |
| 3,891,334 A | * | 6/1975 | Loikitz | 403/234 |
| 3,997,198 A | * | 12/1976 | Linder | 285/281 |
| 4,258,936 A | * | 3/1981 | Goldberg | 285/31 |
| 4,295,754 A | * | 10/1981 | Ashton et al. | 403/369 |
| 4,407,533 A | * | 10/1983 | Giebeler | 285/281 |
| 4,557,509 A | * | 12/1985 | Giebeler | 285/281 |
| 5,887,908 A | * | 3/1999 | White | 285/282 |
| 5,924,937 A | * | 7/1999 | Kuo | 473/296 |
| 6,227,752 B1 | * | 5/2001 | Friedrich | 403/192 |
| 6,460,901 B2 | * | 10/2002 | Rochelle | 285/387 |
| 6,508,493 B1 | * | 1/2003 | Guivarc'h | 285/354 |

* cited by examiner

Primary Examiner—Robert J. Sandy
Assistant Examiner—Ruth C. Rodriguez
(74) Attorney, Agent, or Firm—Welsh & Katz, Ltd.

(57) ABSTRACT

The coupling assembly connects at least first and second members of a structure. The first member has at least a first end with an outer surface, and at least one attachment means is located on the first end of the first member. A collar has at least one attachment means for engaging the at least one attachment means on the first end of the first member, the collar being located on the outer surface of the first end of the first member. A cap surrounds at least the collar on the first end of the first member, the cap having a first end oriented toward the first end of the first member and a second end opposed from the first end. The cap has a lip on the second end, the lip being structured to engage the collar to thereby prevent removal of the cap off the first end. The cap has first connecting means at least on the first end of the cap. A base has a first end connected to the second member, and has a second end, opposed from the first end. The second end has second connecting means for engaging the first connecting means on the first end of the cap.

20 Claims, 7 Drawing Sheets

COUPLING ASSEMBLY HAVING A SPLIT-RING COLLAR LOCKING MECHANISM

FIELD OF THE INVENTION

The present invention pertains to a coupling assembly for connecting components together. More particularly, the present invention pertains to a coupling assembly including a split ring locking collar for securely fastening components to each other to form a durable structure.

BACKGROUND

Coupling assemblies, connecting joints and other similar types of connecting devices are generally known to those skilled in the art. Coupling assemblies can be used to join members to each other, such as pipes, signs, poles, and the like to form a variety of different structures such as playground assemblies, piping systems, and other similar types of weight bearing structures. It is important that these connector assemblies provide a strong connection between the connected elements, especially for structures that are placed under high pressure or an enormous amount of weight, to prevent the structure from collapsing under such conditions. To provide a secure and strong connection between the components, connector assemblies typically require a large variety and number of parts. As a result, construction of these weight bearing assemblies can be time consuming and costly.

U.S. Pat. No. 6,227,752 to Friedrich discloses a connector assembly for joining first and second tubular elements together. The connector assembly includes first and second tubular sections connected by an intermediate connector fitting. The second tubular section and the connector fitting each have bores for receiving a connector fitting. This connector assembly not only requires an additional fastener for proper assembly, but also requires that the bores located in the second tubular section and the connector fitting are properly aligned to receive the fasteners. These extra parts not only can be costly but also render the coupling assembly time consuming to construct.

Accordingly, there exists a need for a coupling assembly that provides a durable connection between components. It is desirable that such coupling assembly requires a minimal number of parts as well as be easy to construct. It is further desirable that such coupling assembly includes a connecting cap mountable to a member and a split locking ring mechanism with a boss portion to securely prevent the connecting cap from sliding along the member. It further desirable that the cap be slidably mountable to the member, enabling the coupling assembly to be easily constructed.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, in the several figures of which like reference numerals identify like elements, and in which:

DETAILED DESCRIPTION

While the present invention is susceptible of embodiments in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In general terms the coupling assembly is used for connecting associated members of a structure to each other. In one embodiment the coupling assembly may have a first member having at least one opening, a second member to be connected to the first member, a cap configured to be positioned about the outer circumference of the first member, a base portion and a spit ring collar to be connected to the first member. The collar may include a radially inwardly directed boss for insertion into an opening formed in the first member to provide a secure connection therewith. The split ring collar may have a split formed therein that enables the collar to be resiliently bent into position about the first member. The base portion may be connected to the second member using connecting means that enable connection with the cap.

In another embodiment, the second member may have an aperture having a first circumference and the base portion may have first end and second ends. In this embodiment the first end has a first circumference smaller than the first circumference of the aperture. Also, in this embodiment the second end has a second circumference larger than the first circumference of the aperture, such that the base portion can be inserted into the body of the second member and the first end can extend perpendicularly outward from the second member through the aperture. In this manner the second end of the base anchors the base to the second member.

In yet another embodiment, the connecting means of the cap may be internal threads and the connecting means of the base may be external threads.

In still yet another embodiment, the coupling assembly the first member may have a generally cylindrically shaped configuration having an outer circumference.

In still yet another embodiment the split ring collar may have a generally cylindrically shaped configuration and an inner circumference larger than the outer circumference of the first member, enabling connection to the first member.

In still yet another embodiment, the first member may have a plurality of openings disposed about the circumference of the first member.

In still yet another embodiment, he split ring collar may have split opposite a boss to enable the collar to be flexed in position about the member.

In still yet another embodiment, the split ring may have beveled outer edges.

In still yet another embodiment, the cap may have a first end having a first circumference for abutment with the first member, and may have a second portion having a larger second circumference having internal threads to provide threaded connection with an associated threaded component.

Figure 1:
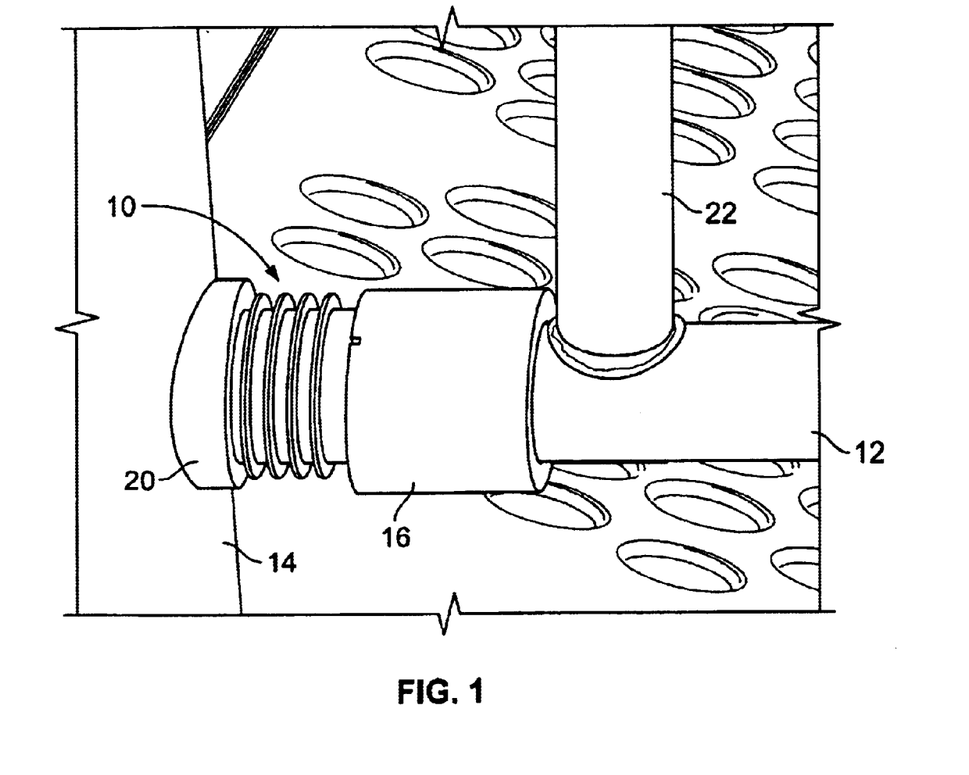
FIG. 1 is a perspective view of a one embodiment of the coupling assembly.

Referring now to FIG. 1, there is shown a coupling assembly 10 for coupling together first and second members 12, 14 of a structure, in accordance with one embodiment of the coupling assembly. The coupling assembly 10 includes a first member 12, a second member 14, a retention sleeve or cap 16, a split-ring collar (not shown because the collar is under the cap 16), and a base 20. The coupling assembly 10 may be used to connect together associated components or members in a variety of structures, such as piping or fluid handling systems, playground equipment, and the like.

In general, the first member 12 may be used to support other associated components of the structure (not shown). It is also contemplated that in a fluid handling system, the first member 12 may be used to provide for a fluid flow through. The first member 12 may be made from numerous materials, such as metal, high-strength plastic, wood, etc. To provide support to the structure (not shown), the first member 12 is positioned adjacent, in coupled connection with the second member 14. The first member 12 and the second member 14 may be fastened by an intermediately positioned base 20 and retention cap 16. As illustrated in FIG. 1, the first member 12 and the second member 14 may be positioned in a substantially perpendicular relationship to each other. However, it is also contemplated that the first and second members 12, 14 may be positioned in face to face relationship to each other, as well as, in virtually any other position, without departing from the novel scope of the coupling assembly.

As shown in FIG. 1, the first member 12 may have an intermediate leg 22 that extends generally perpendicularly outwardly from the first member 12. It is contemplated that the intermediate leg 22 may be securely connected to the first member 12 by welding or other known connecting means.

Figure 2:
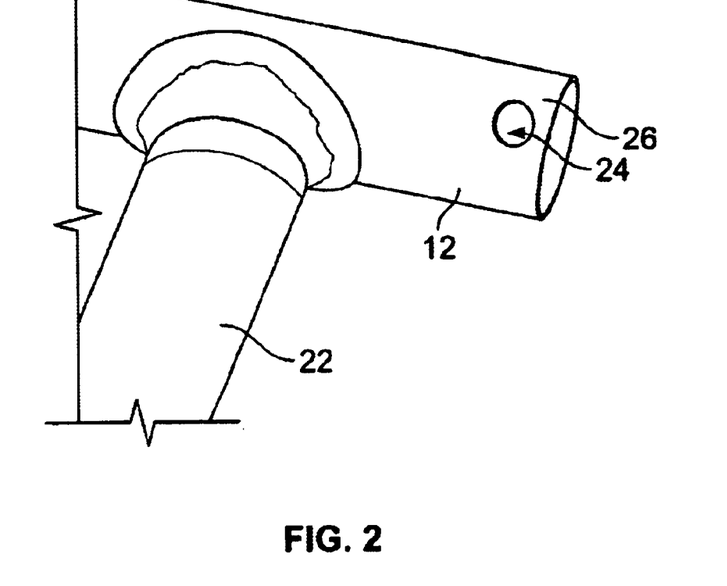
FIG. 2 is a perspective view of a first member used in combination with the coupling assembly according to an embodiment of the coupling assembly.

Referring now to the embodiment depicted in FIG. 2, the first member 12 has a generally cylindrically shaped, tubular elongated body. However, it is to be noted that the first member 12 may have any shape without departing from novel scope of the present invention. The first member 12 has a first end 26, extending beyond the intermediate leg 22. The first end also has an aperture 24 in a region of the first end 26. This aperture forms a first attachment means on the first end 26. Numerous other structures and devices may be used as a first attachment means. The first end 26 is generally open and/or unattached, enabling an open connection with the retention cap 16 and/or connecting base 20.

Figure 3:
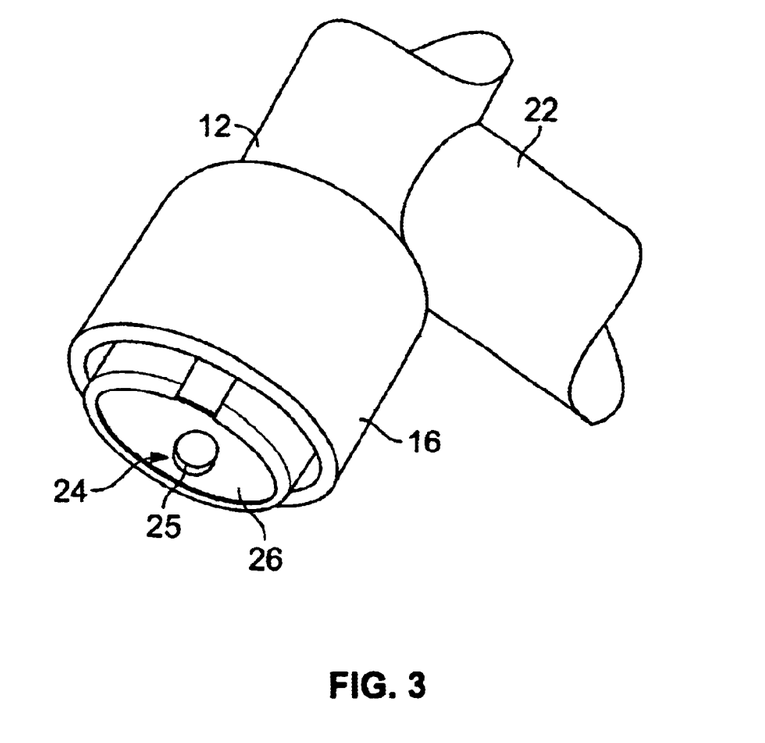
FIG. 3 is a perspective view of the split locking collar having an inwardly extending boss in accordance with one embodiment of the coupling assembly according to an embodiment of the coupling assembly.

The first member 12 is adaptable for receiving a retention device, such as a split ring collar 18 depicted in FIG. 3, in the region of the first end 26. As such, one or more openings 24 are formed in the member 12 enabling insertion of a boss 25 or similar type insertable member on the collar 18. It is to be noted that the opening 24 may be positioned at virtually any location along the member 12, without departing from the novel scope of the coupling assembly. In this embodiment, the opening 24 has a generally circular shape to enable receipt of a circular-shaped member 25. However, the opening 24 may have virtually any desirable shape for receiving any corresponding shaped insertable member 25, without departing from the novel scope of the coupling assembly. In general terms, the opening 24 formed in the first end 26 of the first member 12 in one embodiment of an attachment means on the first end 26 of the first member 12, and the radially inwardly directed boss 25 for insertion into the opening 24 in the first end 26 of the first member 12 is an attachment means on the.

Figure 4:
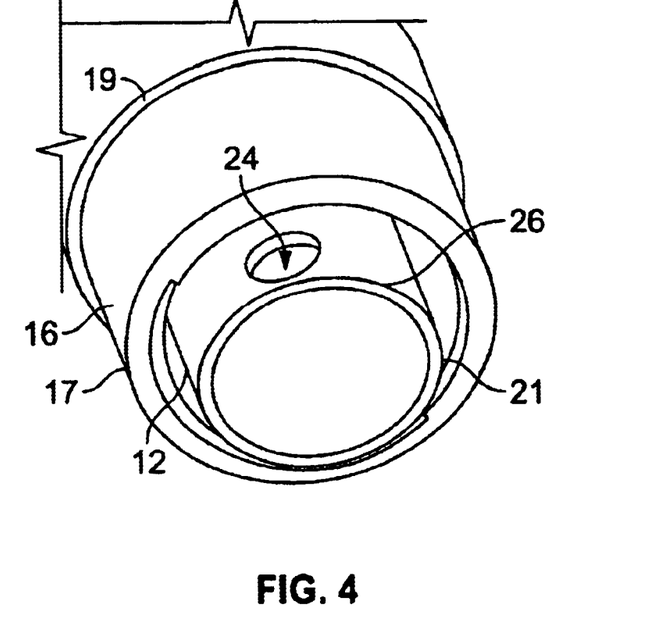
FIG. 4 is a perspective view of the first member and a cap positioned about the first member according to an embodiment of the coupling assembly.
Figure 5:
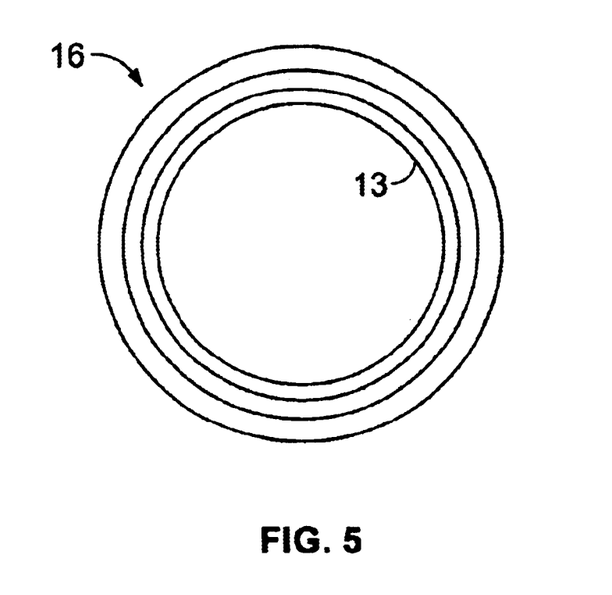
FIG. 5 shows the cap in an end view according to an embodiment of the coupling assembly.
Figure 6:
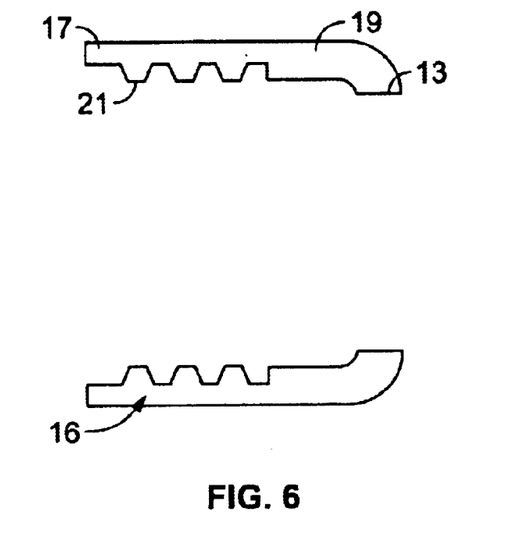
FIG. 6 is a cross sectional view of the cap according to an embodiment of the coupling assembly.

Referring now to the embodiment depicted in FIG. 4, the cap 16 for connecting the first and second members 12, 14 has a generally cylindrical shape. The cap 16 has a first end 17 oriented toward the first end 26 of the first member 12. A second end 19 of the cap 16 is opposed from the first end 17, and the cap has a lip 13 (see FIG. 6) on the second end 19, the lip 13 being structured to engage the collar to thereby prevent removal of the cap 16 off the first end 26. The cap 16 has a first connecting means, such as internal threads 21, at least on the first end 26 of the cap 16. However, it is to be noted that the retention cap 16 may have virtually any desired shape corresponding to the shape of the first member 12 that enables the cap 16 to be positioned around the first member 12. In the depicted embodiment the retention cap 16 has a first end 17 having a first circumference and a second end 19 having a second circumference. The internal threads 21 in the cap 16 enable the cap 16 to be connected to the body 20, which has mating external threads (see FIG. 10). The cap 16 may have other forms of connecting means for securing the cap 16 to the body 20. In general, the cap 16 has first connecting mean and the body 20 has second connecting means for engaging the first connecting means. FIG. 5 shows the cap 16 in an end view, and FIG. 6 is a cross sectional view of the cap 16.

Figure 7:
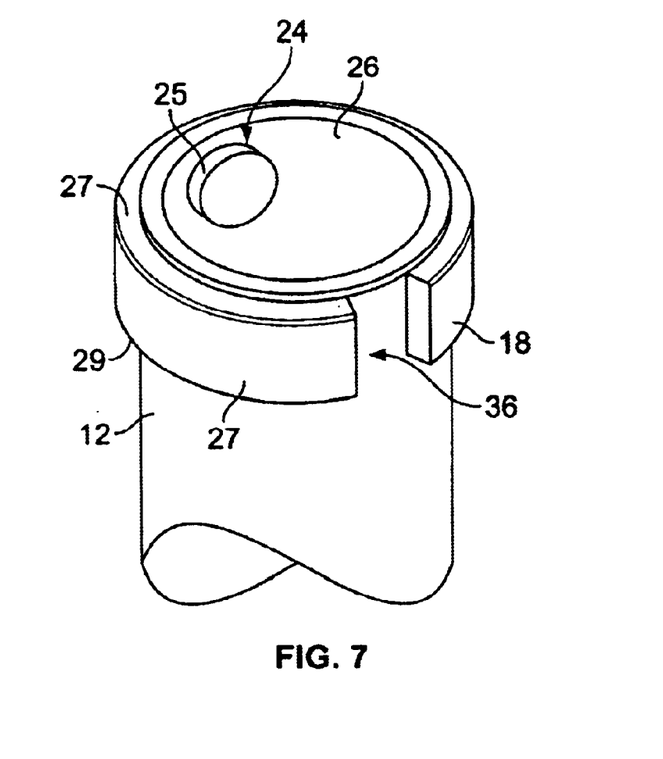
FIG. 7 is a perspective view of the split locking collar positioned about the first member according to an embodiment of the coupling assembly.
Figure 8:
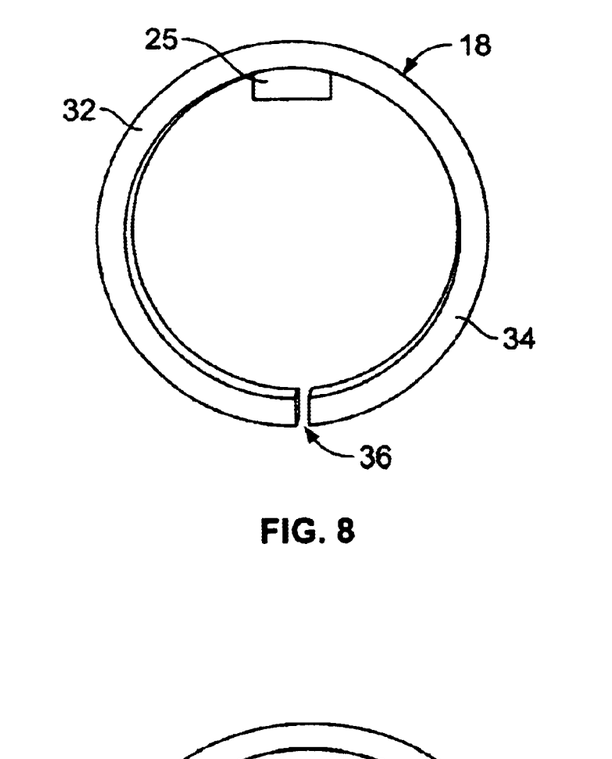
FIG. 8 is a further view of the split locking collar according to an embodiment of the coupling assembly.
Figure 9:
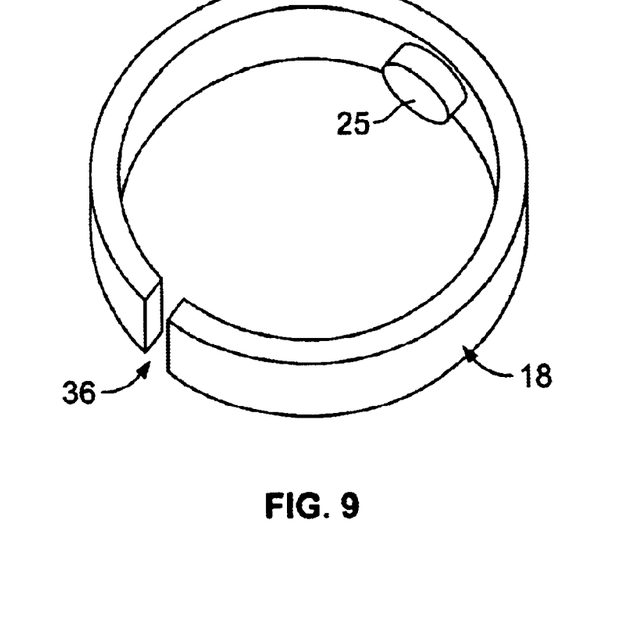
FIG. 9 is a yet another view of the split locking collar according to an embodiment of the coupling assembly.

An embodiment of the split ring collar 18 is depicted in FIGS. 7, 8 and 9. The spit ring collar 18 has a ring portion 27 with a radially inwardly directed boss 25 for insertion into the at least one opening 24 in the first end 26 of the first member 12. In this embodiment the split ring collar 18 is located on an outer surface of the first end 26 of the first member 12. A second end 29 of the collar 18 provides an abutting surface for the second end 19 of the cap 16. As such, the collar 18 provides an abutting force against cap 16 to prevent the cap 16 from sliding off the first end 26 of the member 12.

As shown in embodiment depicted in FIGS. 7, 8 and 9, the split ring collar 18 has a generally cylindrically shaped configuration corresponding to that of the member 12, with an inner circumference on an inside surface 32 and an outer circumference on an outside surface 34. In this embodiment the split ring collar 18 includes a least one boss 25 located on the inner surface 32 of the connecting element 14. The boss 25 may be generally cylindrical shaped enabling insertion into the circular opening 24, however it is contemplated that boss 25 may have virtually any desired shape that enables insertion into the opening 24. It is also contemplated that the split ring collar 18 may have a plurality of boss portions 25 enabling connection with a plurality of openings 24.

In some embodiments the split-ring collar 18 may be constructed from a generally resilient material, such as plastic. As illustrated in FIG. 7, the collar 18 may be positioned around the first end 26 of the member 12 with the boss portion 25 inserted in the opening 24, securely connecting the ring collar 18 to the member 12. The ring collar 18 includes a split 36, which enables the ring collar 18 to compress around the outer surface of the first member 12. The bevel 27a drives the ring collar 18 toward the center of the first member 12 when the shoulder or lip 13 on the cap 16 compresses the ring collar 18. As illustrated in this embodiment, the split 36 may be positioned opposite the boss 25. It is contemplated that the split 36 may be located at virtually any desired location about the circumference of the collar 18.

Figure 10:
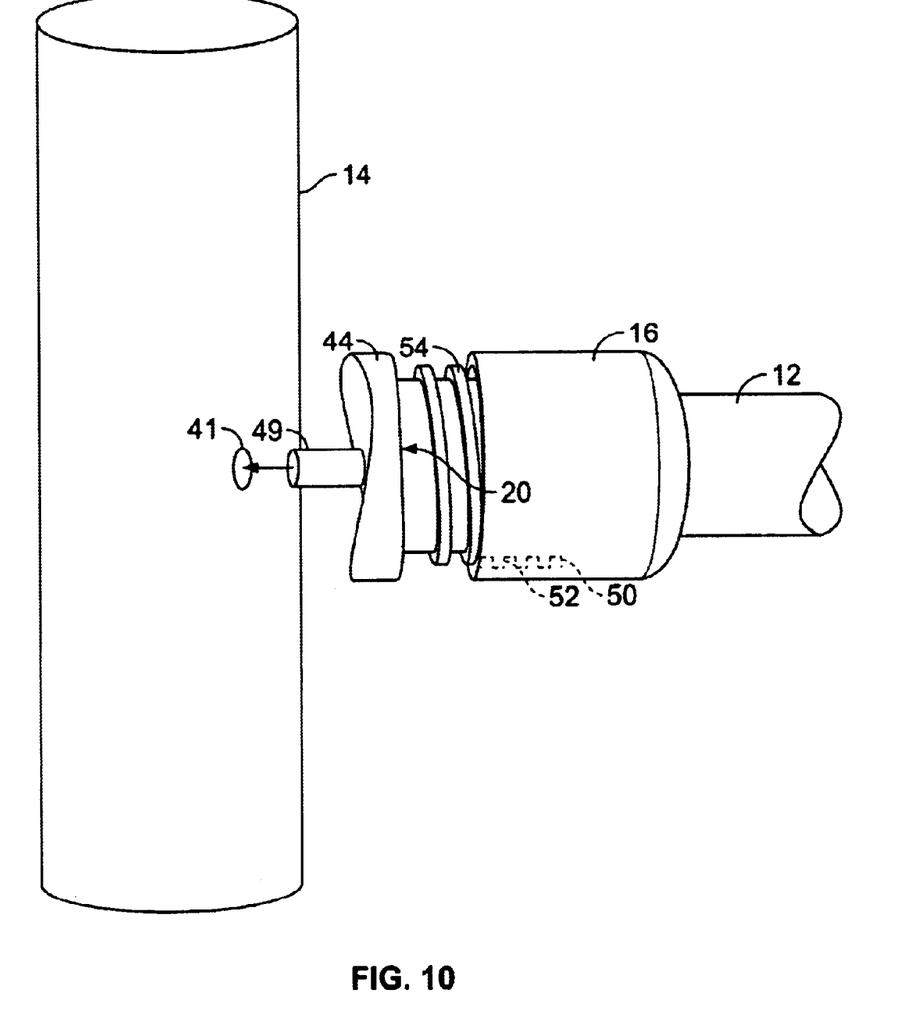
FIG. 10 is a perspective view illustrating the base portion in connected position with the cap according to an embodiment of the coupling assembly.
Figure 11:
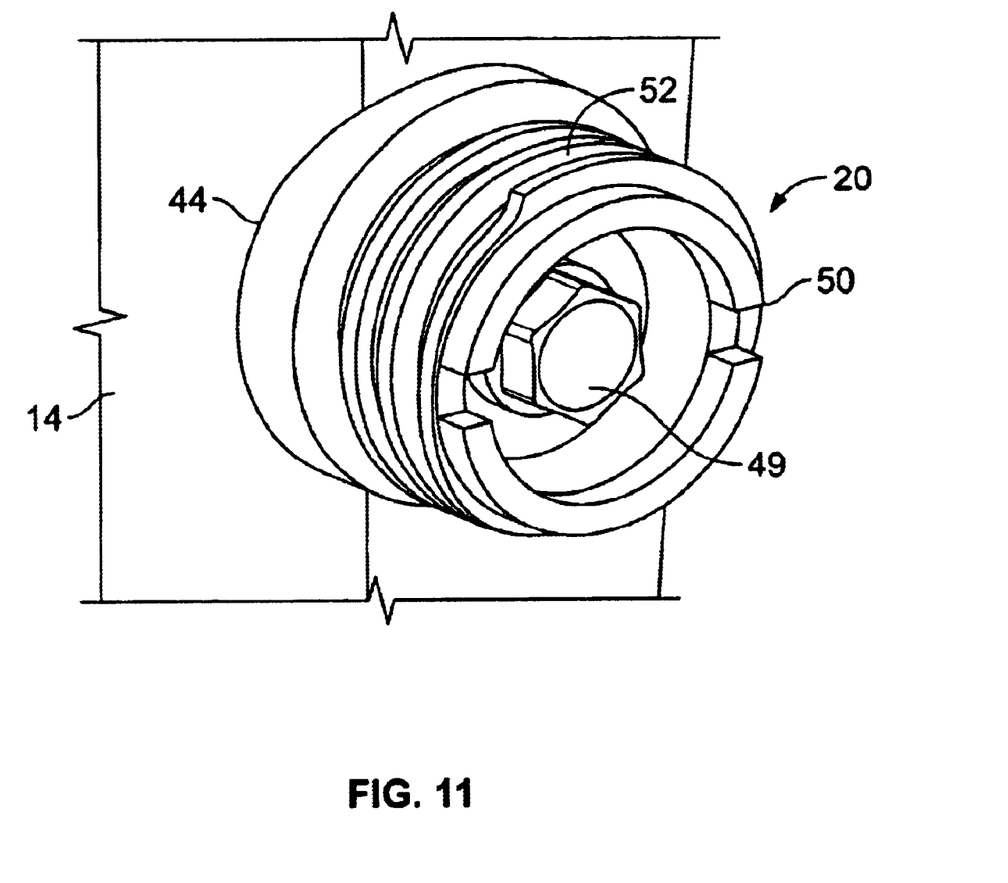
FIG. 11 is a perspective view illustrating attachment of the base portion to the second member according to an embodiment of the coupling assembly.

In a further embodiment depicted in FIG. 10, the base 20 may be connected to the second member 14. The base 20 has a first end 44 and a second end 50. In this embodiment the second member 14 has a bolt receiving structure 41. The first end 44 of the base 20 is structured such that the first end 44 is fitted to the second member. The first end 44 of the base 20 may be retained on the second member 14 by, for example, a bolt 49 that couples to the bolt receiving structure 41 (also see FIG. 11).

The second end 50 of the base 20 may have external threads 52 which enable the base 20 to be connected to the cap 16, which has internal threads 54. In the depicted embodiment, the external threads 52 cooperatively engage the internal threads 54 of the cap 16 providing a secure connection thereto. The threads may be ACME type having an inner diameter of approximately 1.188 inches and an outer diameter of approximately 1.750 inches. However, the threads 52, 54 may have other sizes. In this embodiment, the internal and external threads 52, 54 may be constructed from a generally high strength material such as metal, high-strength plastic or the like.

The present invention is not limited to the particular details of the apparatus and method depicted, and other modifications and applications are contemplated. Certain other changes may be made in the above-described apparatus and method without departing from the true spirit and scope of the invention herein involved. It is intended, therefore, that the subject matter in the above depiction shall be interpreted as illustrative and not illuminating sense.

What is claimed is:

1. A coupling assembly for fixedly connecting at least first and second members of a playground structure into an angular arrangement, the first member having at least a first end with an outer surface and a longitudinal axis, the second member comprising a wall and having a longitudinal axis generally parallel to said wall, the first and second members being directly adjacent to one another when coupled, the coupling assembly comprising:
    at least one attachment means on the first end of the first member along the longitudinal axis of the first member;
    a collar having at least one attachment means for engaging the at least one attachment means on the first end of the first member, the collar being located on the outer surface of the first end of the first member;
    a cap surrounding at least the collar on the first end of the first member, the cap having a first end oriented toward the first end of the first member and a second end opposed from the first end, the cap having a lip on the second end, the lip being structured to engage the collar to thereby prevent removal of the cap off the first end, the cap having first connecting means at least on the first end of the cap; and
    a base having a first end connected to the wall of the second member, and having a second end, opposed from the first end, the second end having second connecting means for engaging the first connecting means on the first end of the cap, such that when the base is attached to the first member the longitudinal axes of the first and second members are not parallel to one another.

2. The coupling assembly according to claim 1, wherein the second member has an aperture, wherein the first end of the base has a first region structured such that the first region is not passable through the aperture and a second region structured such that the second region is passable through the aperture, wherein the first region of the first end of the base is retained in the second member, wherein the second region of the first end of the base extends through the aperture in the second member, and extends outward from the second member.

3. The coupling assembly according to claim 1, wherein the at least one attachment means on the first end of the first member is at least one opening formed in the first end of the first member, and wherein at least one attachment means of the collar is at least one radially inwardly directed boss for insertion into the at least one opening in the first end of the first member.

4. The coupling assembly according to claim 3, wherein the first member has a plurality of openings in the first end of the first member, and wherein the collar has a plurality of bosses.

5. The coupling assembly according to claim 3, wherein the collar has a split located substantially opposite the boss.

6. The coupling assembly according to claim 1, wherein the first connecting means are internal threads and, the second connecting means are external threads.

7. A coupling assembly for fixedly connecting at least first and second members of a playground structure into an angular arrangement, the first member having a first end with an outer surface and a longitudinal axis, the second member comprising a wall and having a longitudinal axis generally parallel to said wall, the first and second members being directly adjacent to one another when coupled, the coupling assembly comprising:
    at least one opening formed in the first end of the first member along the longitudinal axis of the first member;
    a collar with at least one radially inwardly directed boss for insertion into the at least one opening in the first end of the first member, the collar being located on the outer surface of the first end of the first member;
    a cap surrounding at least the collar on the first end of the first member, the cap having a first end oriented toward the first end of the first member and a second end opposed from the first end, the cap having a lip on the second end, the lip being structured to engage the collar to thereby prevent removal of the cap off the first end, the cap having first connecting means at least on the first end of the cap; and
    a base having a first end connected to the wall of the second member, and having a second end, opposed from the first end, the second end having second connecting means for engaging the first connecting means on the first end of the cap, such that when the base is attached to the first member the longitudinal axes of the first and second members are not parallel to one another.

8. The coupling assembly according to claim 7, wherein the first end of the base is structured to fit the second member, and wherein the first end of the base is attached to the second member.

9. The coupling assembly according to claim 7, wherein the first connecting means are internal threads and the second connecting means are external threads.

10. The coupling assembly according to claim 7, wherein the first member has a plurality of openings in the first end of the first member, and wherein the collar has a plurality of bosses.

11. The coupling assembly according to claim 7, wherein the collar has a split located substantially opposite the boss.

12. A coupling assembly for fixedly connecting at least first and second members of a playground structure into an angular arrangement, the first member having a first end with a predetermined outer circumference on an outer surface thereof and a longitudinal axis, the second member comprising a wall and having a longitudinal axis generally parallel to said wall, the first and second members being directly adjacent to one another when coupled, the coupling assembly comprising:

at least one opening formed in the first end of the first member;

a split ring collar having a split ring with a radially inwardly directed boss for insertion into the at least one opening in the first end of the first member, the split ring being located on the outer surface of the first end of the first member, along the longitudinal axis of the first member;

a cap surrounding at least the split ring on the first end of the first member, the cap having a first end oriented toward the first end of the first member and a second end opposed from the first end, the cap having a lip on the second end, the lip having an inner diameter that is less than an outer diameter of the split ring collar, the cap having first connecting means at least on the first end of the cap; and a base having a first end connected to the wall of the second member, and having a second end, opposed from the first end, the second end having second connecting means for engaging the first connecting means on the first end of the cap, such that when the base is attached to the first member the longitudinal axes of the first and second members are not parallel to one another.

13. The coupling assembly according to claim 12, wherein the first end of the base is structured to fit the second member, and wherein the first end of the base is attached to the second member.

14. The coupling assembly according to claim 12, wherein the first connecting means are internal threads and the second connecting means are external threads.

15. The coupling assembly according to claim 12, wherein the first member has a plurality of openings in the first end of the first member, and wherein the collar has a plurality of bosses.

16. The coupling assembly according to claim 12, wherein the split ring collar has a split located substantially opposite the boss.

17. A coupling assembly for fixedly connecting at least first and second members of a playground structure into an angular arrangement, the first member having a first end with a predetermined outer circumference on an outer surface thereof and a longitudinal axis, the second member comprising a wall and having a longitudinal axis generally parallel to said wall, the first and second members being directly adjacent to one another when coupled, the coupling assembly comprising:

at least one opening formed in the first end of the first member;

a split ring collar having a split ring with a radially inwardly directed boss for insertion into the at least one opening in the first end of the first member, the split ring being located on the outer surface of the first end of the first member along the longitudinal axis of the first member;

a cap surrounding at least the split ring on the first end of the first member, the cap having a first end oriented toward the first end of the first member and a second end opposed from the first end, the cap having a lip on the second end, the lip having an inner diameter that is less than an outer diameter of the split ring collar, the cap having first connecting means at least on the first end of the cap; and a base having a first end connected to the wall of the second member, and having a second end, opposed from the first end, the second end having second connecting means for engaging the first connecting means on the first end of the cap, the first end of the base structured to fit the second member, and the first end of the base attached to the second member, such that when the base is attached to the first member the longitudinal axes of the first and second members are not parallel to one another.

18. The coupling assembly according to claim 17, wherein the first connecting means are internal threads and the second connecting means are external threads.

19. The coupling assembly according to claim 17, wherein the first member has a plurality of openings in the first end of the first member, and wherein the collar has a plurality of bosses.

20. The coupling assembly according to claim 17, wherein the split ring collar has a split located substantially opposite the boss.

* * * * *